United States Patent [19]

Wagner

[11] Patent Number: 4,474,908

[45] Date of Patent: Oct. 2, 1984

[54] RUBBER COMPOSITIONS
[75] Inventor: Melvin P. Wagner, Barberton, Ohio
[73] Assignee: PPG Industries, Inc., Pittsburgh, Pa.
[21] Appl. No.: 382,542
[22] Filed: May 27, 1982
[51] Int. Cl.$^3$ .......................... C08K 9/12; C08K 3/36; C08K 5/34
[52] U.S. Cl. .................... 523/213; 524/262; 524/575; 260/766
[58] Field of Search ................ 524/262, 575; 260/766; 523/213

[56] References Cited

U.S. PATENT DOCUMENTS

| | | | |
|---|---|---|---|
| 3,128,196 | 4/1964 | Pierpoint | 106/308 |
| 3,350,345 | 10/1967 | Vanderbilt et al. | 260/41.5 |
| 3,737,334 | 6/1973 | Doran et al. | 106/288 Q |
| 3,768,537 | 10/1973 | Hess et al. | 152/330 |
| 3,873,489 | 3/1975 | Thurn et al. | 260/33.6 AQ |
| 3,881,536 | 5/1975 | Doran et al. | 152/330 |
| 3,884,285 | 5/1975 | Russell et al. | 152/330 R |
| 4,002,594 | 1/1977 | Fetterman | 260/42.37 |
| 4,143,027 | 3/1979 | Sollman et al. | 523/211 |

FOREIGN PATENT DOCUMENTS

| | | | |
|---|---|---|---|
| 0025840 | 4/1981 | European Pat. Off. | 524/262 |
| 2528134 | 1/1976 | Fed. Rep. of Germany | 523/213 |

Primary Examiner—Herbert J. Lilling
Attorney, Agent, or Firm—Irwin M. Stein

[57] ABSTRACT

The abrasion resistance of siliceous filler-reinforced rubber vulcanizates is improved by adding to the unvulcanized rubber composition silane coupling agent comprising a mixture of a mercaptosilane, such as mercaptopropyltrimethoxysilane, and an alkyl alkoxysilane, such as methyltrimethoxysilane. The mercaptosilane is present in amounts of between 0.3 and 15 parts per hundred parts of rubber, and the weight ratio of mercaptosilane to alkyl alkoxysilane is between 0.15:1 and 15:1. Preferably, the silanes in a ratio of about 1:1 are admixed with a hydrocarbon process oil and the oil-silane mixture added to the siliceous filler-rubber mixture.

17 Claims, No Drawings

RUBBER COMPOSITIONS

DESCRIPTION OF THE INVENTION

It is conventional in the rubber industry to incorporate reinforcing pigments as fillers into natural and synthetic rubber to increase the physical properties of the rubber vulcanizate. Principal among the reinforcing pigments used today are the various carbon blacks. One of the principal non-black fillers used in the rubber industry is siliceous pigment, eg., finely-divided hydrated silicas and silicats. These siliceous pigments are used to impart improved tensile strength, tear resistance and abrasion resistance to the rubber vulcanizate. Hydrated siliceous pigments are also used in combination with carbon blacks to obtain maximum mileage in off-the-road tires, e.g., tires for mining and logging operations and for road-building equipment. Such applications have become well established. However, when used as the sole reinforcing filler, siliceous pigments do not provide the overall improved performance obtained by the use of the carbon blacks. This is observed most readily in rubber vulcanizates used for tires, e.g., tire treads.

Various silane coupling agents have been suggested for use with siliceous pigment when such fillers are incorporated into rubber in order to improve the performance of the rubber vulcanizate. Among the various organosilane coupling agents suggested for such use are the mercaptoalkyltrialkoxysilanes, e.g., mercaptopropyltrimethoxysilane. It has been reported that the use of appropriate amounts of such coupling agents, particularly mercaptopropyltrimethoxysilane, in siliceous filler-reinforced synthetic rubbers provides at least equivalent performance to carbon black-reinforced synthetic rubbers in several key physical properties such as 300% modulus, tensile strength abrasion resistance, and heat build-up. However, the high cost of such coupling agents has deterred the more general use of siliceous fillers as the principal reinforcing pigment in large volume rubber applications.

It has now been discovered that the efficiency of mercaptosilane coupling agent can be significantly increased by using an alkoxysilane in combination with the mercaptosilane. Utilization of the present discovery permits the preparation of siliceous filler-reinforced rubber vulcanizates at a lower cost for equivalent performance. Conversely, significantly improved performance in such areas, as for example abrasion resistance, can be obtained at the same cost by utilizing the present discovery.

In accordance with the present invention, a curable rubber composition comprising a curable rubber, finely-divided reinforcing siliceous pigment and silane coupling agent is prepared. The silane coupling agent of the present invention comprises a mixture of mercaptosilane having the graphic formula,

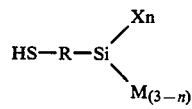

(1)

and alkoxysilane of the graphic formula,

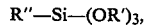

(2)

wherein X is halogen or $-OR'$, M is hydrogen, $C_1-C_{10}$ alkyl, or halosubstituted $C_1-C_{10}$ alkyl, R is $C_1-C_4$ alkylene, R' and R" are each selected from $C_1-C_{10}$ alkyl, and n is 1, 2 or 3. In the above formulae, the halogen portion of the silane can be selected from the group consisting of chlorine, bromine, iodine, and fluorine, preferably chlorine. R is preferably $C_1-C_3$ alkylene e.g., methylene, ethylene, and propylene, R' and R" are preferably $C_1-C_4$ alkyl, more preferably methyl and ethyl, X is preferably $-OR'$, and n is preferably 3.

The mercaptosilane of the silane coupling agent is added to the curable rubber composition in amounts of between 0.3 and 15 parts, more preferably, between 0.3 and 4.5 parts, per hundred parts of rubber. The weight ratio of mercaptosilane to alkoxysilane typically ranges between 0.15:1 and 15:1, preferably between 0.6:1 and 6:1, and, more preferably, about 1:1. In a preferred embodiment, at least 0.75 parts, more preferably at least 1.0 part, of mercaptosilane per 100 parts of rubber is present in the rubber composition.

As examples of mercaptosilanes within the scope of the above graphic formula (1), there can be mentioned mercaptomethyltrimethoxysilane, mercaptoethyltrimethoxysilane, mercaptopropyltrimethoxysilane, mercaptomethyltriethoxysilane, mercaptoethyltripropoxysilane, and mercaptopropyltriethoxysilane.

As Examples of alkoxysilanes within the scope of the above graphic formula (2), there can be mentioned methyltrimethoxysilane, methyltriethoxysilane, methyltripropoxysilane, methyltributoxysilane, ethyltrimethoxysilane, ethyltriethoxysilane, propyltrimethoxysilane, propyltriethoxysilane and propyltripropoxysilane.

The silane coupling agent can be added to the rubber compound in any convenient manner. For example, it can be added separately but simultaneously with the siliceous filler and other additives during conventional mixing of the rubber compound in a Banbury mixer or on the rubber mill. The coupling agent can be in any one of several forms when it is so mixed with the rubber. For example, it can be added in an undiluted stage, dissolved in an organic solvent, e.g., benzene or xylene, or dissolved or suspended in water or a processing oil commonly used in the rubber compound. Preferably, the silane coupling agent is dispersed in a processing oil compatible with the rubber compound. The silane coupling agent-oil mixture is then added to the rubber compound or composition.

Typical of rubber process oils are the paraffinic, naphthenic, or aromatic hydrocarbon fractions defined by the American Society of Testing Materials (ASTM) designation D-2226. An example of such process oil is Circo Light Rubber Process Oil, a product of Sun Oil Company. The amount of process oil used will depend on the end use of the vulcanized rubber composition and typically varies from about 5 to 50 parts of process oil per hundred parts of rubber.

In a preferred embodiment, the silane coupling agent is admixed with the siliceous filler and the curable rubber prior to incorporation of polar additives, particularly soaps, metal oxides, e.g., zinc oxide, amines glycols, and accelerators, e.g., guanidine, into the vulcanizable rubber mixture.

In a further embodiment of the present invention, the silane coupling agent is blended first with the siliceous filler and the silane coupling agent-siliceous filler blend is incorporated into the rubber compound or the mixture of rubber compound and other conventional additives, e.g., the polar additives described above. Blending of the siliceous filler and silane coupling agent can be achieved in the customary manner with the help of conventional mixing means, e.g., a rubber mill or Banbury mixer. The silane coupling agent is thereby homogeneously and more uniformly distributed on the surface of the siliceous filler. In this manner, the silane coupling agent can be more rapidly incorporated into the vulcanizable rubber composition.

In a still further embodiment of the present invention, the silane coupling agent can be formulated with the siliceous filler to prepare a rubber compounding additive, i.e., a silica-silane concentrate. The concentrate has the advantage that it can be handled as a free-flowing, substantially dry powder product which can be added to the vulcanizable rubber composition in amounts required to introduce the desired quantity of silane coupling agent. The concentrate can be prepared by admixing the siliceous filler and silane coupling agent alone or by mixing the siliceous filler with a dispersion of the silane coupling agent in the aforedescribed processing oil, water, hydrocarbon solvent, e.g., benzene, or xylene, or other suitable non-reactive liquid that is chemically inert with respect to the coupling agent and siliceous pigment. Blending of the siliceous pigment and silane coupling agent can be accomplished by mixing the two for between 1 and 120 minutes until the coupling agent or dispersion of coupling agent is adsorbed on the pigment. The concentrate can comprise from about 25 to about 75 weight percent of the silane coupling agent with from about 75 to about 25 weight percent siliceous filler. As siliceous fillers have a high capacity for adsorbing liquids, a significant quantity of silane coupling agent and/or dispersing liquid medium can be adsorbed onto the siliceous filler before it becomes non-free flowing. A typical dry, flowable, powdered concentrate will comprise about 30 weight percent siliceous filler and about 70 weight percent of the silane coupling agent dispersed in a rubber process oil. The amount of siliceous filler added to the vulcanizable rubber composition with the concentrate additive is taken into account in calculating the total amount of siliceous filler which is to be added to the rubber composition.

Siliceous fillers (referred to herein also as siliceous pigment or silica pigment) that can be used include, for example, silicates and both pyrogenic and precipitated finely-divided silicas of the type commonly employed for compounding with rubber. Such highly dispersed silicas (silicon dioxide) have a BET surface area in the range of between about 40 and about 600, more usually 50 to 300 square meters per gram and have an ultimate particle size in the range of from 5 to 100 nanometers (50 to 1000 angstroms), preferably between 5 and 40 and, more preferably, between 15 and 30 nanometers.

Such silica fillers can be produced, for example, by precipitation from solutions of silicates, e.g., sodium silicate, by hydrolysis and/or oxidative high temperature conversion. There can also be used flame hydrolysis of volatile silicon halides, e.g., silicon tetrachloride, or by electric arc processes. These silicas, in a given case, can also be present as mixed oxides or oxide mixtures with oxides of the metals aluminum (alumina), magnesium, (magnesium oxide), calcium (calcium oxide), barium (barium oxide), zinc (zinc oxide), zirconium (zirconium oxide), or titanium (titanium dioxide).

Synthetic silicates include, for example, aluminum silicate or alkaline earth silicates, such as magnesium or calcium silicates with specific surface areas of from about 20 to 400 square meters per gram and primary particle sizes of from about 10 to 400 nanometer (nm).

The siliceous filler is preferably of the type obtained by precipitation from a soluble silicate, e.g., sodium silicate. For example, siliceous pigment produced according to the method described in U.S. Pat. No. 2,940,830 can be used. These precipitated amorphous hydrated silica pigments have an $SiO_2$ content of at least 80 or 85, preferably at least 90, more preferably 93–97 percent by weight on an anhydrous basis, i.e., including bound water. A typical commercial form of such reinforcing siliceous pigment is manufactured and sold by PPG Industries, Inc., under the trademark, Hi-Sil®233.

The amount of siliceous filler used as the reinforcing filler in the rubber compositions described herein can vary widely. Generally between about 10 and about 90 parts of siliceous filler per 100 parts of total rubber are used. More typically, between about 30 and 75 parts of siliceous filler per 100 parts of rubber are used. On the average, 50 to 65 parts of siliceous filler per 100 parts of rubber is found most desirable.

The silane coupling agent of the present invention can be used in vulcanizable rubber compositions in which improvement in the aforementioned physical properties is desired. Principally, the present invention contemplates the use of the herein described silane coupling agents for mechanical rubber goods such as belting, hoses, motor mounts, tires and other rubber applications where abrasion resistance or rigidity are desired. Vulcanized rubber compositions incorporating the silane coupling agent of the present invention are especially contemplated for use in tire treads, for pneumatic tires and other types of tires.

Curable rubbers principally contemplated for use in combination with the silane coupling agent of the present invention are well known to the skilled artisan in rubber chemistry and include the sulfur-curable rubbers. Particularly contemplated are those which are typically used for mechanical rubber goods. As examples of such rubbers there can be mentioned natural rubber, styrene-butadiene rubber (40–95 percent butadiene and 5–60 percent styrene), polybutadiene, ethylene-propylene-diene (EPDM) rubbers, polyisoprene, butadiene-acrylonitrile copolymers and polychloroprene. Mixtures of such synthetic rubbers with natural rubber are also contemplated.

The silane coupling agent, silane coupling agent-siliceous filler blend or concentrate can be mixed with the uncured rubbery elastomer used to prepare the vulcanizable rubber composition by conventional means such as in a Banbury mixer or on a rubber mill at temperatures between about 100° F. and 300° F. (38° C.–150° C.). A typical vulcanizable rubber composition will contain, based on 100 parts of vulcanizable rubber polymer, from 30 to 75 parts of siliceous filler, between 0.3 and 4.5 parts of mercaptosilane, and an equal amount by weight of alkoxysilane (basis the mercaptosilane). Other conventional rubber additives present are the conventional sulfur or peroxide cure systems.

The sulfur-cure system can include 0.5 to 3 parts sulfur, 2 to 5 parts zinc oxide and 0.5 to 2 parts accelerator. The peroxide-cure system can include 1 to 4 parts of a peroxide such as dicumyl peroxide. Other conventional rubber additives can also be used. Such additives include other fillers, such as carbon black, oils, plasticizers, accelerators (guanidines), antioxidants, heat stabilizers, light stabilizers, zone stabilizers, organic acids such as for example stearic acid, benzoic acid, or salicyclic acid, other activators, extenders and coloring pigments. The particular compounding recipe will vary with the particular vulcanizate prepared; but, such recipes are well-known to those skilled in the rubber compounding art.

The vulcanizable rubber composition is vulcanized or cured to a rubber vulcanizate in accordance with customary procedures known in the rubber industry. Exemplification of industrial rubber vulcanizates (articles) which can be produced utilizing the silane coupling agent of the present invention include cable insulation, hoses, driving belts, V-belts, conveyor belts, roller coatings, vehicle tire treads, subtreads, tire carcasses, tire sidewalls, cross country tires, shoe sole materials, packing rings, damping elements and many others.

The present invention is more particularly described in the following examples which are intended as illustrative only since numerous modifications and variations therein will be apparent to those skilled in the art. All parts and percentages in said examples are by weight unless otherwise indicated.

EXAMPLE I

A series of rubber compositions were prepared by mixing the ingredients in Table I in a Banbury mixer for about 6–8 minutes at a temperature of about 150° C. The amount of mercaptopropyltrimethoxysilane and methyltrimethoxysilane added to the rubber composition were varied in the compositions prepared and such amounts are found in Table III. When a combination of mercaptopropyltrimethoxysilane and methyltrimethoxysilane was added to the rubber composition, the silanes were premixed with the process oil prior to their addition to the Banbury mixer. The silanes were added to the Banbury mixer along with the first half of the silica filler added to the mixer.

The ingredients in Table II were added to the mixture removed from the Banbury mixer on an open rubber mill. The resulting rubber compositions were cured at 150° C. for a time sufficient to reach 90% of the maximum torque obtained using the oscillating Disk Rheometer (90% ODR).

The resulting vulcanizates were tested for various physical properties in accordance with standard ASTM procedures. The amounts of the variable ingredients and appropriate test results are reported in Table III.

TABLE I

| Ingredients | Parts By Weight |
|---|---|
| Styrene-Butadiene Rubber[1] | 100 |
| Hi Sil ® 233 Silica Filler | 60 |
| Mercaptopropyltrimethoxysilane (MPS) | Variable |
| Methyltrimethoxysilane (MTMS) | Variable |
| Process Oil[2] | 10 |
| Stearic Acid | 1 |
| Agerite Resin D[3] Antioxidant | 1 |

[1]SBR-1502 (cold polymerized styrene - butadiene rubber containing 25% styrene).
[2]Circo Light Process Oil.
[3]A polymerized 1,2-dihydro-2,2,4-trimethyl-quinoline.

TABLE II

| Ingredients | Parts By Weight |
|---|---|
| Zinc Oxide | 4 |
| Sulfur | 2.5 |
| Santocure[1] Accelerator | 1.0 |
| TMTD[2] | 0.75 |

[1]N—cyclohexyl-2-benzothiazolesulfenamide.
[2]Tetramethylthiuram disulfide.

TABLE III

| SILANE | 1 | 2 | 3 | 4 | 5 | 6 | 7 | 8 | 9 | 10 | 11 |
|---|---|---|---|---|---|---|---|---|---|---|---|
| MPS | 1.5 | 2.21 | 0.06 | 0.75 | 1.5 | 0.75 | 0.36 | 0 | 0.37 | 0 | 0.75[a] |
| MTMS | 0 | 0.36 | 0.37 | 0.75 | 1.5 | 0.75 | 2.21 | 1.5 | 0.06 | 0 | 0.75 |
| PROCESS DATA | | | | | | | | | | | |
| ML4-100[1] | 83 | 90 | 128 | 96 | 99 | 97 | 103 | 128 | 122 | 153 | 103 |
| 90% ODR[2], min. (150° C.) | 29 | >40 | >60 | >40 | 15 | >40 | 16 | >60 | >60 | >60 | 16 |
| TEST DATA | | | | | | | | | | | |
| 300% Modulus[3], psi | 1120 | 1630 | 1230 | 1030 | 2170 | 1140 | 1350 | 1180 | 760 | 550 | 1330 |
| Tensile Strength[3], psi | 3560 | 3260 | 3200 | 2990 | 3120 | 3150 | 2810 | 2730 | 3370 | 2980 | 3020 |
| Elongation[3], % | 610 | 450 | 800 | 580 | 380 | 560 | 490 | 720 | 710 | 760 | 520 |
| Hardness | 66 | 65 | 75 | 70 | 67 | 71 | 72 | 72 | 70 | 75 | 74 |
| Pico Abrasion Index[4], % | 90 | 104 | 64 | 88 | 114 | 93 | 85 | 66 | 76 | 65 | 87 |
| Trouser Tear, ppi | 71 | 47 | 198 | 106 | 35 | 90 | 70 | 184 | 139 | 185 | 83 |
| Goodrich Flexometer[5] (0.175 Stroke, 1 MPa, 100° C., 20 min.) | | | | | | | | | | | |
| ΔT,°C. | 38 | 26 | 37 | 32 | 21 | 30 | 25 | 46 | 38 | 44 | 31 |
| Permanent Set, % | 5.9 | 2.6 | 13.2 | 5.3 | 1.9 | 5.1 | 5.2 | 8.8 | 2.4 | 6.5 | 6.5 |
| Water Volume Swell, % (24 hrs./90° C.) | 7.0 | 5.8 | 7.9 | 6.3 | 9.1 | 6.0 | 6.0 | 7.5 | 7.3 | 8.8 | 5.9 |

[1]Tested According to ASTM D1646
[2]Tested According to ASTM D2084
[3]Tested According to ASTM D412
[4]Tested According to ASTM D2228
[a]MPS from a different commerical source than in Runs 1-7 and 9.

The data of Table III show that the combination of Mercaptopropyltrimethoxysilane (MPS) and methyltrimethoxysilane (MTMS) was more effective than MPS alone, and particularly when at least 0.75 parts of MPS (phr) was present. Significantly higher Pico Abrasion Index was obtained with the combination of MPS and MTMS than with MPS alone. The data also show that substantially equal Pico Abrasion Index was obtained with less MPS when MTMS was also present. The extent of reduction in the ΔT (Flexometer) and Trouser tear also followed the efficient coupling obtained with the combination of MPS and MTMS.

Although the present process has been described with reference to specific details of certain embodiments thereof, it is not intended that such details should be regarded as limitations upon the scope of the invention except as and to the extent that they are included in the accompanying claims.

I claim:

1. In a rubber composition comprising a curable rubber, from 10 to 90 parts, per 100 parts of rubber, of finely divided reinforcing siliceous pigment, and a silane coupling agent, the improvement wherein the silane coupling agent is a combination of a mercaptosilane and an alkoxysilane and said mercaptosilane and alkoxysilane are admixed simultaneously with said siliceous pigment, said mercaptosilane having the graphic formula,

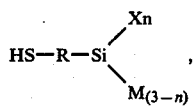

and said alkoxysilane having the graphic formula,

wherein X is halogen or —OR', M is hydrogen, $C_1$–$C_{10}$ alkyl, or halosubstituted $C_1$–$C_{10}$ alkyl, R is $C_1$–$C_4$ alkylene, R' and R" are each selected from $C_1$–$C_{10}$ alkyl, and n is 1, 2 or 3, the mercaptosilane being present in said rubber composition in amounts of between 0.3 and 15 parts, per 100 parts of rubber, and the weight ratio of mercaptosilane to alkoxysilane therein being between 0.15:1 and 15:1.

2. The composition of claim 1 wherein there is present at least 0.75 parts, per hundred parts of rubber, of mercaptosilane.

3. The composition of claim 1 wherein there is present at least 1.0 parts, per hundred parts of rubber, of mercaptosilane.

4. The composition of claims 1 or 2 wherein the ratio of mercaptosilane to alkoxysilane is between 0.6:1 and 6:1.

5. The composition of claim 3 wherein the ratio of mercaptosilane to alkoxysilane is about 1:1.

6. The composition of claims 1, 2 or 3 wherein the mercaptosilane is mercaptopropyltrimethoxysilane and the alkoxysilane is methyltrimethoxysilane.

7. The composition of claim 6 wherein the curable rubber is a sulfur-curable rubber.

8. The composition of claim 6 wherein the ratio of mercaptosilane to alkoxysilane is from about 0.6:1 to about 6:1.

9. The composition of claim 6 wherein the ratio of mercaptosilane to alkoxysilane is about 1:1.

10. The composition of claim 9 wherein the curable rubber is a sulfur-curable rubber.

11. The composition of claim 10 wherein the rubber is a styrene-butadiene rubber.

12. The composition of claims 1, 2 or 3 wherein the silane coupling agent is added to the composition admixed with a rubber process oil.

13. A vulcanizate prepared from the rubber composition of claims 1, 2 or 3.

14. A vulcanizate prepared from the rubber composition of claim 6.

15. A vulcanizate prepared from the rubber composition of claim 8.

16. A vulcanizate prepared from the rubber composition of claim 9.

17. A vulcanizate prepared from the rubber composition of claim 11.

* * * * *